United States Patent [19]

Tsuruta

[11] 4,433,350

[45] Feb. 21, 1984

[54] TRACKING ERROR DETECTION SYSTEM IN A MAGNETIC REPRODUCING APPARATUS

[75] Inventor: Masahiko Tsuruta, Yokohama, Japan

[73] Assignee: Victor Company of Japan, Ltd., Yokohama, Japan

[21] Appl. No.: 316,777

[22] Filed: Oct. 30, 1981

[30] Foreign Application Priority Data

Nov. 4, 1980 [JP] Japan .................................. 55-154874

[51] Int. Cl.³ ............................................. G11B 21/10
[52] U.S. Cl. ........................................ 360/70; 360/73; 360/77
[58] Field of Search ...................... 360/70, 77, 75, 73, 360/DIG. 1

[56] References Cited

U.S. PATENT DOCUMENTS

| 4,148,083 | 4/1979 | Watanabe | 360/77 |
| 4,172,265 | 10/1979 | Sakamoto et al. | |
| 4,184,181 | 1/1980 | Mijotovic | 360/77 |

FOREIGN PATENT DOCUMENTS

| 2737561 | 2/1978 | Fed. Rep. of Germany . |
| 1573064 | 8/1980 | United Kingdom . |

Primary Examiner—Alan Faber
Attorney, Agent, or Firm—Posnack, Roberts, Cohen & Spiecens

[57] ABSTRACT

A tracking error detection system in a magnetic reproducing apparatus having M rotary heads where M is an integer and M rotary heads respectively and successively scan over oblique tracks on a magnetic tape to reproduce signals, comprises a head moving mechanism for moving at least one rotary head along a height direction thereof, a head moving signal generating circuit for generating a head moving signal having a square wave shape wherein a rise and a fall are obtained for every M·T interval, where T is a period in which one rotary head scans one track, and applying the head moving signal to the head moving mechanism, and a detecting circuit for comparing a reproduced signal level at a position separated by a predetermined distance from an end part of a track, of a signal reproduced by scanning the track in a state where the rotary head is moved towards one direction by the head moving mechanism, with a reproduced signal level at a position separated by the above predetermined distance from an end part of another track, of a signal reproduced by scanning the other track in a state where the rotary head is moved towards the other direction, and detecting tracking error.

6 Claims, 15 Drawing Figures

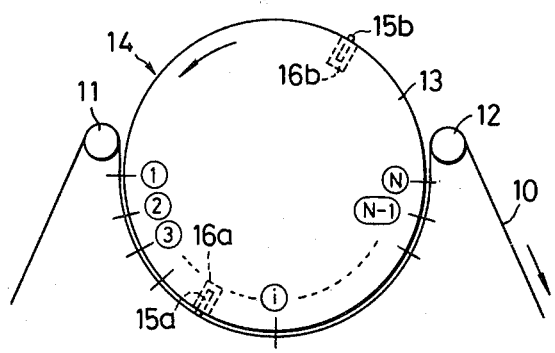
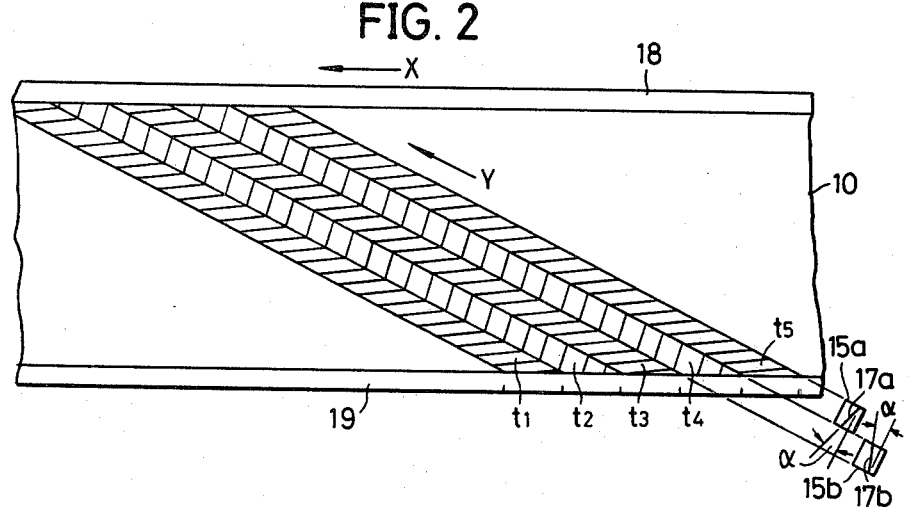
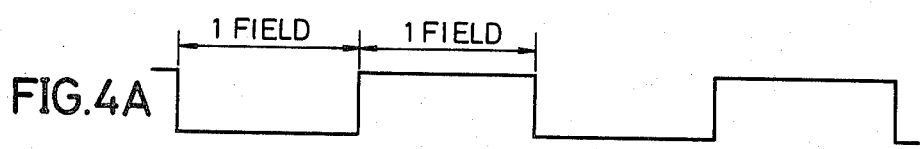
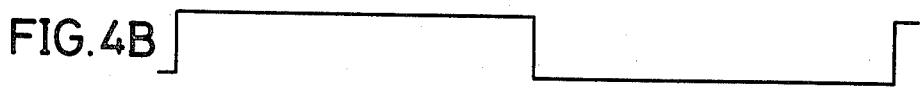
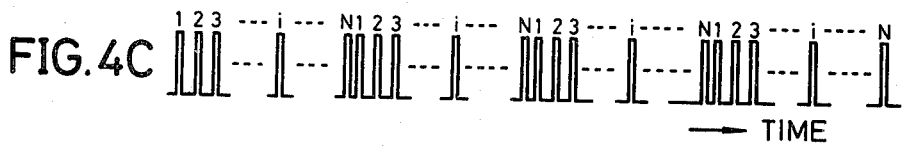

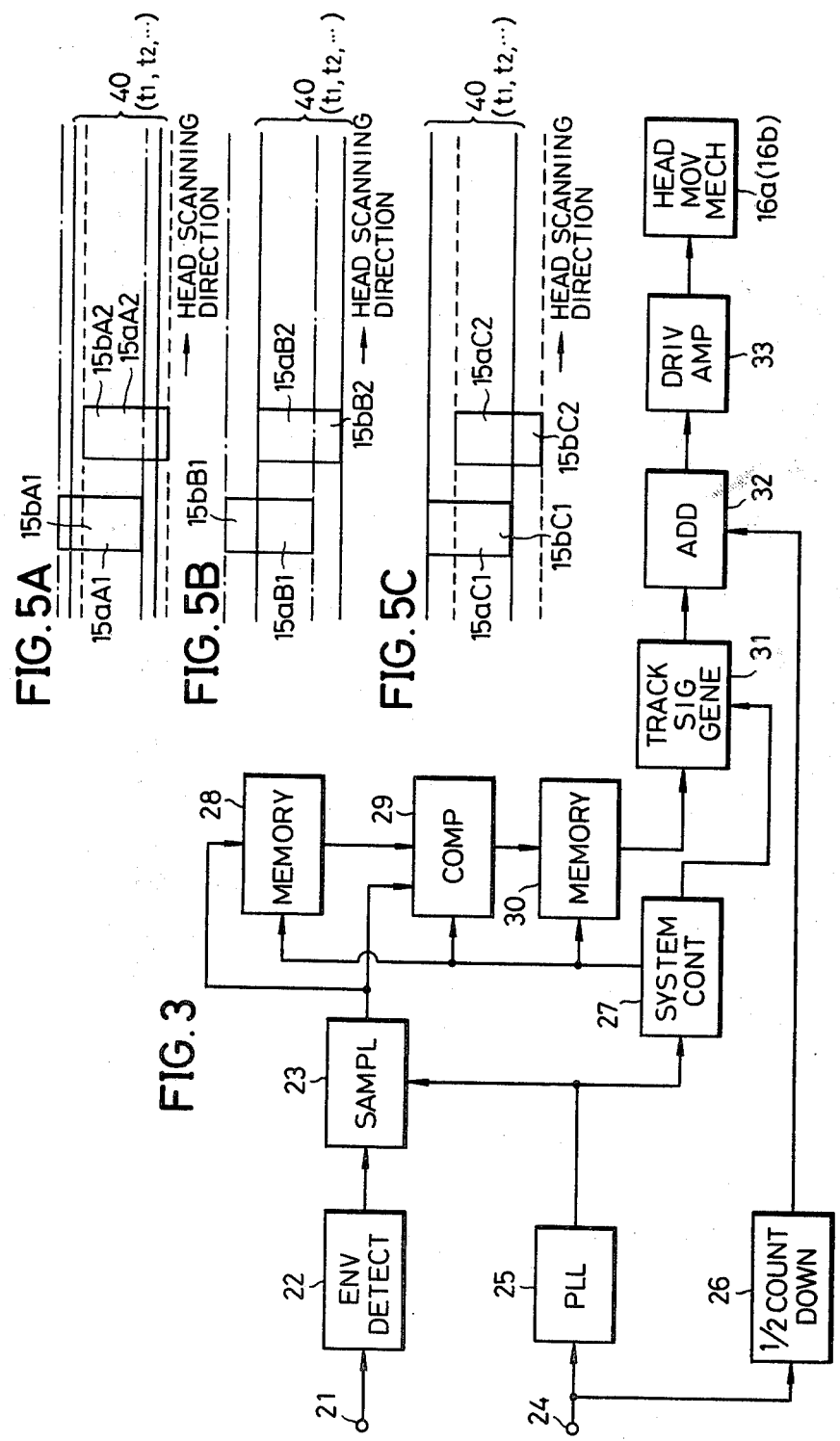

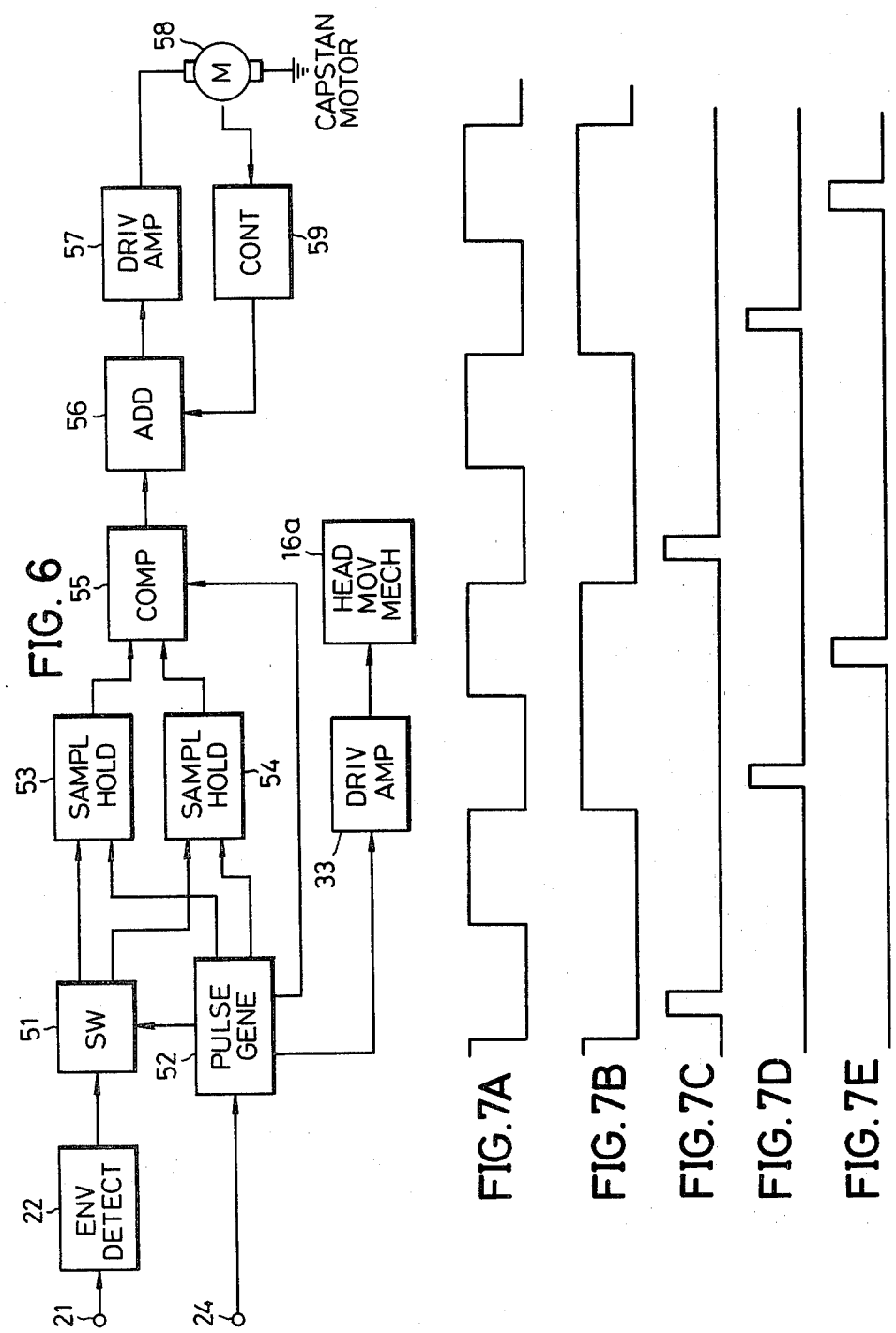

TRACKING ERROR DETECTION SYSTEM IN A MAGNETIC REPRODUCING APPARATUS

BACKGROUND OF THE INVENTION

The present invention generally relates to tracking error detection systems in magnetic reproducing apparatuses, and more particularly to a tracking error detection system capable of rapidly detecting tracking error by use of a simple construction, by swinging or moving rotary heads which perform recording and reproduction with respect to a magnetic tape, in a vertical direction with respect to the rotational plane of a drum provided with the above rotary heads.

Conventionally, magnetic recording and/or reproducing apparatuses (hereinafter referred to as VTRs) which record and/or reproduce video signals on oblique tracks in a magnetic tape by use of rotary heads, have been in wide practical use. And recently, in order to extend the recording and reproducing time of the VTR for home use, apparatuses have been realized in which the tape travelling speed is reduced to one-third normal speed with respect to a cassette tape for performing two hours of normal recording and reproduction, for example, and using magnetic heads having narrow track widths, to perform six hours of recording and reproduction. In this case, the duration of the recording and reproduction is increased to three times that upon normal recording and reproduction. In the above type of a VTR, some degradation is introduced in the signal-to-noise (S/N) ratio during the six-hour recording and reproduction compared to the normal two-hour recording and reproduction. However, the above six-hour recording and reproduction can be performed with sufficient S/N ratio for practical purposes.

When an extended-duration recording or reproduction is performed by reducing the track width, track pitch, and the like, the recording and reproducing operation is easily affected by tracking error as compared to the case of normal recording or reproduction in which the track width and the track pitch are large. Hence, during the above extended-duration recording and reproduction, it is essential that an accurate tracking operation is performed.

However, in reality, the size, angle, and the like of a mechanism in a tape moving system are not completely identical between different magnetic recording and/or reproducing apparatuses, and slight variations exist within the tape moving system. Inconsistency in the size and configuration of a tape guiding groove formed in a fixed guide drum, mounting height and mounting angle of a tape travel guide pole, mounting position and mounting angle of the fixed guide drum, and the like, are the main causes for the above variations introduced in the tape moving system. Accordingly, when a magnetic tape recorded by one VTR is reproduced by another VTR, bends are relatively introduced in the track on the magnetic tape with respect to the scanning loci of the rotary magnetic heads. When this kind of bends are introduced in the track on the magnetic tape, tracking error is introduced during scanning operations of the rotary magnetic heads. Furthermore, when inconsistency exists in each VTR with respect to the length of the magnetic tape along the tape travelling path, from a position where the rotary magnetic head begins to make contact with the magnetic tape to where a control head for recording and reproducing a control signal with respect to the magnetic tape is positioned, the above tracking error is also introduced. Reproduction cannot be performed with a fine S/N ratio when the above described tracking error exists.

Conventionally, as a system for correcting and controlling the above tracking error, there was a system in which a head moving mechanism is used to vary the height positions of the rotary magnetic heads by a control signal. In this system, a signal having a constant frequency of 480 Hz, for example, is applied to the head moving mechanism so that the heads swing with a small amplitude during each track scanning period. The quantity and direction of the tracking error are detected from the variation in the level of the reproduced signal. Hence, the control signal is obtained from the above detected result, and the control signal thus obtained is fed back to the head moving mechanism.

However, in the above conventional system, there was a disadvantage in that the level variation in the reproduced signal is large, since the heads swing several times during each track scanning operation of the heads. Moreover, when this system is applied to a so-called azimuth recording and/or reproducing apparatus in which recording and/or reproduction is performed by use of a pair of heads having gaps with azimuth angles in mutually opposite directions, color unevenness is introduced due to deviation introduced in the time axis by the swinging of the heads, since the gaps in the heads form certain angles with respect to the swinging directions of the heads. In addition, the tracking error is constantly corrected during a scanning operation with respect to one track. Therefore, when the response of the above head moving mechanism is slow, the correction of the tracking error cannot be performed accurately, and in some cases, the tracking error is increased instead.

The bends in the track do not differ for each track, and the bends are commonly introduced in each of the adjacent tracks due to the various inconsistencies in the tape moving system within different recording and/or reproducing apparatuses. That is, a track bend identical to that existing at a part of the tape which is a certain distance from the edge of the tape with respect to one track, is introduced along the longitudinal direction of the tape for substantially the entire length of the tape, at parts which are the above certain distance from the edge of the tape.

Accordingly, a tracking control system was proposed in a U.S. patent application Ser. No. 225,006 filed on Jan. 14, 1981 entitled "TRACKING CONTROL SYSTEM IN A MAGNETIC REPRODUCING APPARATUS" in which the assignee is the same as that of the present application. This proposed tracking control system comprises head swinging means responsive to a sinusoidal wave head swinging voltage for varying the height position of the rotary magnetic head, and swinging the scanning position of the rotary magnetic head with respect to the track of the magnetic tape in the width direction of the track in a sinusoidal manner, one or a plurality of memory means for sampling and memorizing a voltage which is to be supplied to the head swinging means, at a point in time corresponding to when the rotary magnetic head passes one or a plurality of predetermined relative tracing positions with respect to the magnetic tape, level detecting means for detecting the level of a signal reproduced by the rotary magnetic head at a point in time identical to that of the above, maximum level detecting means for detecting whether the level detected by the level detecting means has reached a maximum, controlling means for enabling the reading-out of the voltage memorized in the memory means upon detection of the maximum level by the maximum level detecting means, and adding means for adding the voltage read out from the memory means and the head swinging voltage supplied from the head swinging voltage generating means, and supplying the added voltage to the head swinging means.

However, in the above proposed system, the head swinging signal is a sinusoidal wave, and the head are swung so as to depict loci of sinusoidal forms. Hence, at the maximum and minimum points in the sinusoidal wave, the swinging deviation quantities of the heads with respect to a reference position become maximum, and the sensitivity of the tracking error detection becomes high. However, at intermediate parts of the sinusoidal wave between the maximum and minimum points, the swinging deviation quantities of the heads with respect to the reference position become small. Accordingly, there is a disadvantage in that the sensitivity of the tracking error detection becomes low. Moreover, there was a further disadvantage in that the sensitivity of the tracking error detection constantly varies due to the swinging of the heads.

Furthermore, there was a disadvantage in that color unevenness is introduced due to the displacement of the heads although the unevenness is not as significant as in the conventional system, since the heads constantly swing when the heads are scanning a track.

SUMMARY OF THE INVENTION

Accordingly, it is a general object of the present invention to provide a novel and useful tracking error detection system in a magnetic reproducing apparatus, in which the above described disadvantages have been overcome.

Another and more specific object of the present invention is to provide a tracking error detection system in a magnetic reproducing apparatus having M (M is an integer) rotary heads, wherein the tracking error is detected by moving the rotary heads by a square wave signal of M-track scanning period. According to the system of the present invention, the heads are moved in the form of a square wave since a square wave voltage is used to move the heads. Thus, after the heads are moved and displaced, the heads are maintained at the same height positions until the heads are again moved and displaced. Therefore, the sensitivity of the tracking error detection does not vary and is always maintained at the maximum sensitivity. Further, deviation is not introduced in the time axis, and color unevenness is accordingly not introduced.

Other objects and further features of the present invention will be apparent from the following detailed description when read in conjunction with the accompanying drawings.

BRIEF DESCRIPTION OF THE DRAWINGS

FIG. 1 is a diagram showing the relationship between a rotary magnetic head and a magnetic tape travelling path for explaining reproduced signal level detection points in a system according to the present invention;

FIG. 2 is a diagram for explaining the relationship between track patterns of the magnetic tape and the reproduced signal level detection points;

FIG. 3 is a systematic block diagram showing a first embodiment of a tracking error detection system according to the present invention;

FIGS. 4A, 4B, and 4C are diagrams respectively showing signal waveforms at each part of the systematic block diagram of FIG. 3;

FIGS. 5A, 5B, and 5C respectively are diagrams for explaining states of tracking error in the system according to the present invention;

FIG. 6 is a systematic block diagram showing a second embodiment of a tracking error detection system according to the present invention; and FIGS. 7A through 7E are diagrams respectively showing signal waveforms at each part of the block diagram shown in FIG. 6.

DETAILED DESCRIPTION

In FIG. 1, a magnetic tape 10 is guided by guide poles 11 and 12, and obliquely guided with respect to a guide drum 14 consisting of a fixed drum (not shown) and a rotary drum 13, to travel in the direction of an arrow. The magnetic tape 10 travels in a state making contact with the guide drum 14 throughout a predetermined angular range (an angle slightly larger than 180 degrees) determined by the guide poles 11 and 12. A pair of rotary magnetic heads 15a and 15b are provided on the rotary drum 13 at positions mutually opposing each other along the diametrical direction. The rotary magnetic heads 15a and 15b are respectively supported by head moving mechanisms 16a and 16b.

As the above head moving mechanisms 16a and 16b, although not shown in the drawings, mechanisms of known construction can be used in which a known flexion type bimorph comprising a pair of piezoelectric ceramic plates having mutually different flexion direction bound together through a conductive flexible plate. One end of the bimorph is fixed and the other free end is mounted to the rotary head, to displace the head in a perpendicular direction with respect to the track longitudinal direction. The head is thus displaced by varying the height position of the head by use of the piezoelectric ceramic plate which expands at one end and contracts at the other end according to the polarity and value of the voltage applied thereto.

When the heads 15a and 15b pass positions ① through Ⓝ in FIG. 1, the level of the reproduced signal at each position is detected in a manner described hereinafter. The position ① is in the vicinity of the starting point where the scanning is started, and the position Ⓝ is in the vicinity of the terminal point where the scanning is terminated. The interval between the positions ① through Ⓝ is divided into N (N is an integer) equally spaced positions.

The heads 15a and 15b respectively have gaps 17a and 17b. These gaps 17a and 17b respectively have an azimuth angle α (six degrees, for example) in mutually opposite directions with respect to a direction which is perpendicular to the scanning direction, as shown in FIG. 2. The tracks recorded and formed on the tape 10 travelling in the direction of an arrow X by the head 15a rotating in the direction of an arrow Y are designated by characters t1, t3, t5, . . . (wherein the subscripts of t are odd numbers). The tracks recorded and formed by the video head 15b are designated by characters t2, t4, t6, . . . (wherein the subscripts of t are even numbers). The tracks t1, t2, t3, . . . are in contiguous contact without gaps or guard bands formed therebetween, whereby the tape utilization efficiency is high. Each track is recorded with a part of a video signal corresponding to substantially one field. A vertical synchronizing signal is positioned near an end part of the track. Although not shown, an audio signal and a control signal are recorded, respectively, at the upper and lower lateral edges of the tape 10, along tracks 18 and 19 in the longitudinal direction of the tape.

During normal reproduction, the magnetic tape 10 is moved so as to travel in the direction of the arrow X at the same speed as that upon recording. Thus reproduction is performed in which the tracks t1, t3, t5, . . . are scanned by the head 15a and the tracks t2, t4, t6, . . . are scanned by the head 15b in an alternate manner. Accordingly, if the head 15a were to scan over the tracks t2, t4, . . . and the head 15b were to scan over the tracks t1, t3, . . . (that is, if a so-called opposite tracking were to be carried out), there would be almost no reproduction of signals because of the azimuth loss. Therefore, the rotational phases of the rotary heads are normally controlled by a control signal so that a track recorded by a head having a gap with a certain azimuth angle is scanned by a head having a gap of the same azimuth angle.

Next, description will be given with respect to a first embodiment of a tracking error detection system according to the present invention.

The frequency-modulated video signal reproduced from each of the tracks t1, t2, . . . by the head 15a (15b), is supplied to a generally used demodulating circuit system, and also to an envelope detector 22 through an input terminal 21. Thus, the envelope of the frequency-modulated video signal is detected at the envelope detector 22. A detected output of the envelope detector 22 is supplied to a sampling circuit 23.

On the other hand, a drum pulse indicated in FIG. 4A detected according to the rotation of the rotary drum 13, is applied to a terminal 24. The drum pulse obtained from the terminal 24 is supplied to a phase-locked-loop (PLL) circuit 25 and to a ½-count-down circuit 26. The above drum pulse is a symmetrical square wave which rises and falls at every one-field interval. The PLL circuit 25 operates as a pulse generator, and is synchronized with respect to the rise and fall in the input drum pulse, to generate N (N is an integer) sampling pulses during one-field interval as indicated in FIG. 4C. The above sampling pulses are supplied to the sampling circuit 23 and to a system controller 27 consisting of a micro-computer. The points in time when each of the sampling pulses are generated, respectively correspond to the points in time when the head 15a (15b) scans over the positions ① through ⓝ on the tape. Accordingly, the sampling circuit 23 samples the output of the envelope detector 22 by use of the sampling pulses obtained from the PLL circuit 25. Thus, the sampling circuit 23 obtains a signal in which the levels of the signals reproduced by the head 15a (15b) at the positions ① through ⓝ are sampled.

The frequency of the above input drum pulse is frequency-divided into one-half the original frequency, at the ½-count-down circuit 26. Hence, as indicated in FIG. 4B, the above input drum pulse is converted into a symmetrical square wave which rises and falls at every two-field (one frame) interval. The output signal of the above ½-count-down circuit 26 is added with a control voltage which will be described hereinafter at an adder 32. Accordingly, the output of the adder 32 is applied to the head moving mechanism 16a (16b) as a head moving signal, through a driving amplifier 33.

Therefore, the head 15a (15b) is instantaneously changed over to positions higher and lower than a reference height position, for every two-field interval. That is, the head 15a (15b) is at a first position which is higher than the reference height position when the head moving signal indicated in FIG. 4B is of high level. On the other hand, the head 15a (15b) is at a second position which is lower than the reference height position when the head moving signal is of low level. The amplitude of the above movement of the head is of a small value so as not to interfer with the normal reproducing operation.

Therefore, in a case where the scanning performed by the head 15a (15b) is normal and no tracking error exists, the head 15a scans slightly above a recording track 40 (t1) as indicated by 15aA1 in FIG. 5A, when the first field is reproduced. When the succeeding second field is reproduced, the head 15b scans slightly above the track 40 (t2) as indicated by 15bA1 in FIG. 5A. Moreover, when the third field is reproduced, the head 15a scans slightly below the recording track 40 (t3) as indicated by 15aA2. Similarly, the head 15b scans slightly below the recording track 40 (t4) as indicated by 15bA2, when the fourth field is reproduced. Thereafter, the above described operations are repeated.

When the heads 15a and 15b are shifted upwards, these heads depict scanning loci indicated in FIG. 5B. On the other hand, when the heads 15a and 15b are shifted downwards, these heads depict scanning loci indicated in FIG. 5C. In the above FIGS. 5B and 5C, 15aB1 and 15aC1 indicate the first field reproducing position of the head 15a, 15bB1 and 15bC1 indicate the second field reproducing position of the head 15b, 15aB2 and 15aC2 indicate the third field reproducing position of the head 15a, and 15bB2 and 15bC2 indicate the fourth reproducing field of the head 15b.

The values at the positions ①, ②, . . . , ⓝ of the head 15a with respect to the track t1 which are sampled at the above sampling circuit 23, for example, are supplied to a memory 28 and stored therein. Next, the values at the positions ①, ②, . . . , ⓝ of the head 15a with respect to the track t3, are supplied to the memory 28 and a comparator 29. The above memory 28 and the comparator 29 are controlled by a control signal having the same timing as the sampling pulse indicated in FIG. 4C which is obtained from the system controller 27. The values at the positions ①, ②, . . . , ⓝ with respect to the track t1 which are read-out from the memory 28, are supplied to the comparator 29 wherein these values are respectively compared with the values at the positions ①, ②, . . . , ⓝ with respect to the track t3. The above comparing operation is performed so that the values at the same positions are compared. That is, the value at the position ① with respect to the track t1 is compared with the value at the position ① with respect to the track t3, the value at the position ② with respect to the track t1 is compared with the value at the position ② with respect to the track t3, . . . . A signal which is in accordance with the direction of the tracking error of the head 15a, can thus be obtained.

The output of the comparator 29 is stored in a memory 30 as a tracking error detection signal, and then supplied to a tracking control signal generating circuit 31. The signal thus supplied to the tracking control signal generating circuit 31 is converted into a tracking control signal according to each scanning position of the head 15a, for correcting the tracking error. The above output tracking control signal is supplied to the adder 32 wherein the output tracking control signal is added with the above head moving signal. The output of the adder 32 is supplied to the head moving mechanism 16a through the driving amplifier 33, to perform a tracking control operation with respect to the head 15a. Therefore, the head 15a is controlled so that the head accurately scans over the track even when bends exist in the track.

Although not shown in the drawings and description thereof is omitted, a system consisting of the above described memory, comparator, tracking control signal generating circuit, and the like are also provided with respect to the head 15b.

Next, description will be given with respect to a second embodiment of a tracking error detection system according to the present invention, by referring to FIG. 6.

The envelope of the reproduced frequency-modulated video signal obtained from the terminal 21 is detected at the envelope detector 22, and thereafter supplied to a switching circuit 51.

On the other hand, a drum pulse indicated in FIG. 7A (same as the drum pulse indicated in FIG. 4A) which is obtained from the terminal 24, is supplied to a pulse generator 52. A head moving signal obtained from the pulse generator 52 having a waveform indicated in FIG. 7B wherein the signal rises and falls for every two-field interval, is supplied to the head moving mechanism 16a through the driving amplifier 33. Accordingly, the head 15a is moved in a similar manner as in the first embodiment of the invention described above. A switching signal having the same waveform as that indicated in FIG. 7B which is obtained from the pulse generator 52, is supplied to the switching circuit 51. In response to this switching signal, the switching circuit 51 alternately switches over to supply the output of the envelope detector 22 to sample-and-hold circuits 53 and 54.

The above sample-and-hold circuit 53 samples and holds the signal supplfied from the switching circuit 51, by a sampling pulse obtained from the pulse generator 52 having a waveform indicated in FIG. 7C. On the other hand, the sample-and-hold circuit 54 simultaneously samples and holds the signal supplied from the switching circuit 51, by a sampling pulse indicated in FIG. 7D which is obtained from the pulse generator 52. The above sampling pulses indicated in FIGS. 7C and 7D, for example, are obtained from a monostable multivibrator which is triggered by the rise and fall of the signal indicated in FIG. 7B. The points in time until the above sampling pulses are generated from the above rise and fall of the signal indicated in FIG. 7B, are respectively the same.

Therefore, for example, the levels of signals on the tracks t1, t3, ... which are equi-distant from the edge of the track with respect to the head 15a, are thus sampled and held. The outputs of the sample-and-hold circuits 53 and 54 are respectively supplied to a comparator 55 wherein the levels of the outputs are compared. The comparator 55 generates a compared output when supplied with a pulse indicated in FIG. 7E from the pulse generator 52.

The output of the comparator 55 is supplied to an adder 56 wherein the output is added with a signal obtained from a capstan motor rotational speed control circuit 59. Hence, the output of the above adder 56 is applied to a capstan motor 58 through a driving amplifier 57. Accordingly, the capstan motor 58 is controlled so as to control the tape travel for each of the tracks t1, t3, t5, ..., in order to prevent the introduction of tracking error. In the present embodiment of the invention, a tracking control cannot be performed with respect to every track as a whole, so as to follow the bends in the track. However, the tracking control operation can be performed without the use of a control signal. Hence, the control track 19 shown in FIG. 2 can be eliminated, or the control track 19 can be used for another channel for an audio signal, for example.

Further, the present invention is not limited to these embodiments, but various variations and modifications may be made without departing from the scope of the present invention.

What is claimed is:

1. A tracking error detection system in a magnetic reproducing apparatus having M rotary heads, where M is an integer, said M rotary heads respectively and successively scanning over oblique tracks on a magnetic tape to reproduce a signal which has been recorded on said magnetic tape, said system comprising:

square wave signal generating means for generating a square wave signal having a waveform which repeats a rise and fall cycle per 2 M·T period, where T is a period in which one of said M rotary heads scans over one track;

head moving means responsive to said square wave signal for moving at least one rotary head in a direction perpendicular to the longitudinal direction of the track;

detecting means for detecting the level of a signal reproduced by said one rotary head when said one rotary head scans at least one position at a predetermined distance from an end part of a track along the longitudinal direction of the track; and comparing means supplied with the detected level from said detecting means, for comparing a pair of successively detected levels of the signals reproduced by said one rotary head to detect tracking error.

2. A system as claimed in claim 1 in which each track is recorded with a video signal in units of one field of said video signal, and M is equal to 2;

said head moving means moving first and second rotary heads in response to said square wave signal;

said detecting means comprising first detecting means for detecting the level of the video signal reproduced by the first rotary head when the first rotary head scans a position at the predetermined distance from the end of a track along the longitudinal direction of the track, and second detecting means for detecting the level of the video signal reproduced by the second rotary head when the second rotary head scans a position at the predetermined distance from the end of an other track along the longitudinal direction of the track;

said comparing means comprising first comparing means for comparing a pair of levels of the reproduced video signal which are successively detected by said first detecting means, to produce a first error signal with respect to the tracking of said first rotary head, and second comparing means for comparing a pair of levels of the reproduced video signal which are successively detected by said second detecting means, to produce a second error signal with respect to the tracking of said second rotary head.

3. A system as claimed in claim 1 in which said detecting means detects the level of the signal reproduced by said one rotary head when said one rotary head scans each of N positions by which the track is divided into parts of equal length, where N is an integer greater than or equal to 2; and said comparing means compares the levels of the reproduced signal detected by said detecting means during the scanning of said one rotary head over a track respectively with the corresponding levels of the reproduced signal detected by said detecting means during the scanning of said one rotary head over another track followed after the scanning of said one rotary head over the track.

4. A system as claimed in claim 3 in which said detecting means comprises means for generating equally spaced N sampling pulses for every period T, and sampling means for sampling the signal reproduced by said one rotary head by the N sampling pulses; and said comparing means comprises memory means for storing the output signal of said sampling means during the scanning of said one rotary head over the track and reading out the stored signal during the scanning of said one rotary head over the other track, and a comparator for comparing the readout signal from said memory means with the output signal of said sampling means during the scanning of said one rotary head over the other track to detect tracking error.

5. A system as claimed in claim 1 further comprising means for forming a tracking control signal for correcting tracking error according to the tracking error output signal of said comparing means, and means for adding said square wave signal and said tracking control signal to apply the added signal to said head moving means.

6. A system as claimed in claim 1 in which said reproducing apparatus has a capstan motor for rotating a capstan for moving said magnetic tape, and said system further comprises means for controlling the rotation of said motor according to the output signal of said comparing means.

* * * * *